United States Patent [19]

Mizuno et al.

[11] Patent Number: 5,485,552
[45] Date of Patent: Jan. 16, 1996

[54] METHOD OF CREATING A ROBOT MOTION PROGRAM

[75] Inventors: Tohru Mizuno, Tama; Tatsuo Karakama; Ryo Nihei, both of Oshino; Takenobu Miura, Hino, all of Japan

[73] Assignee: Fanuc Ltd., Minamitsuru, Japan

[21] Appl. No.: 272,637

[22] Filed: Jul. 11, 1994

Related U.S. Application Data

[63] Continuation of Ser. No. 917,150, Aug. 10, 1992, abandoned.

[30] Foreign Application Priority Data

Dec. 18, 1990 [JP] Japan ................................. 4-411481

[51] Int. Cl.⁶ ............................................... G05B 19/42
[52] U.S. Cl. .............................. 395/99; 395/88; 395/92
[58] Field of Search ................................ 395/85, 88, 92, 395/99

[56] References Cited

U.S. PATENT DOCUMENTS

| | | | |
|---|---|---|---|
| 4,379,335 | 4/1983 | Kirsch et al. | 395/99 |
| 4,390,954 | 6/1983 | Manning | 364/477 |
| 4,482,968 | 11/1984 | Inaba et al. | 395/85 |
| 4,484,294 | 11/1984 | Noss | 395/92 |
| 4,511,985 | 4/1985 | Inaba et al. | 395/86 |
| 4,517,652 | 5/1985 | Bennett et al. | 364/513 |
| 4,549,276 | 10/1985 | Inaba et al. | 395/88 |
| 4,798,341 | 1/1989 | Gimple | 901/43 |
| 4,815,011 | 3/1989 | Mizuno et al. | 395/99 |
| 4,821,402 | 4/1989 | Kosho et al. | 364/474.01 |
| 4,902,868 | 2/1990 | Slee et al. | 219/86.7 |
| 5,008,834 | 4/1991 | Mizuno et al. | 395/92 |
| 5,051,676 | 9/1991 | Seki et al. | 395/92 |
| 5,057,995 | 10/1991 | Mizuno et al. | 395/80 |
| 5,079,491 | 1/1992 | Nose et al. | 395/99 |
| 5,161,101 | 11/1992 | Nishiyama et al. | 395/88 |

FOREIGN PATENT DOCUMENTS

| | | |
|---|---|---|
| 177164 | 4/1986 | European Pat. Off. . |
| 0298128 | 1/1988 | European Pat. Off. ....... G05B 19/403 |
| 3545957 | 7/1986 | Germany . |
| 59-140090 | 1/1984 | Japan . |
| 60-91404 | 10/1985 | Japan . |
| 61-62106 | 3/1986 | Japan . |
| 62-106506 | 5/1987 | Japan . |
| 62-276605 | 12/1987 | Japan . |
| 63-136205 | 6/1988 | Japan . |

OTHER PUBLICATIONS

Kilpatrick et al., "The Formal Development of Robot Software", IEE Colloquium on Application of CASE Tools, Conf. Apr. 5, 1990, pp. 2/1–2/4.

*Primary Examiner*—Robert W. Downs
*Attorney, Agent, or Firm*—Staas & Halsey

[57] ABSTRACT

A method of teaching a robot motion program, which facilitates the preparation of programs, and in which a required one of a plurality standard motion programs for operating a robot in accordance with stereotyped motion patterns is read from a memory of a robot control device and displayed on a display screen of a teaching control panel. An operator operates the teaching control panel to add, though the display screen, position and speed data etc. to the standard motion program, or modify, through the display screen, the data previously described in the standard motion program, whereby a motion program for a robot operation to be performed in accordance with a sterotyped motion pattern or a pattern similar thereto can be created easily.

10 Claims, 6 Drawing Sheets

METHOD OF CREATING A ROBOT MOTION PROGRAM

This application is a continuation of application Ser. No. 07/917,150, filed Aug. 10, 1992, now abandoned.

DESCRIPTION

1. Technical Field

This invention relates to a method of creating a robot motion program, more particularly, to a method of teaching a robot motion program, which facilitates the preparation of a robot motion program for operating a robot in accordance with regular or stereotyped motion patterns or motion patterns similar thereto.

2. Background Art

Generally, motion programs used for operating a robot are made up of a series of program statements described in a programming language, and are created by a manual operation of the keyboard of a programming system. For example, a motion program, partly shown in FIG. 1, for transporting a workpiece inside a pallet to the outside of same by a robot is described using a programming language. In FIG. 1, reference numerals 81 to 86 denote data blocks respectively specified by block numbers "N0000" to "N0005", symbol "BE" denotes a block end, and symbol "P" denotes identical or different coordinate positions which are defined separately. During an operation of the robot in accordance with the palletizing program shown in FIG. 1, a robot hand first moves at a steady-state speed in accordance with a command "P F100%" included in the first block 81 of the program, and then moves to the vicinity of the pallet at 80% of the steady-state speed in accordance with the command in the second block 82. If, thereafter, a workpiece pickup permission signal "2" is issued within a predetermined period of time, the robot takes out the workpiece from the pallet; and if the signal "2" is not issued during the predetermined period, the program jumps to a label "10" indicating an instruction (not shown) included in the program. Subsequently the robot hand moves at a 60% speed and opens in accordance with the command in the third block 83, and then moves at a 20% speed to close by, in accordance with the command in the fourth block 84. Then, the robot hand moves successively at 20% and 60% speeds in accordance with the commands in the fifth and sixth blocks 85 and 86, respectively.

The robot motion program is described in a programming language, as described above. There are a variety of programming languages which differ depending on the manufacturers or robot types, and various programming systems also differ in their operating methods depending on their applications. Accordingly, each individual robot user must learn one or more programming languages and one or more programming system operation methods, thus requiring a considerable time for training. Furthermore, when creating a program, a sequence of program statements must be successively input to the programming system through the keyboard, which requires considerable time and labor for the program preparation. However, certain types of robots, e.g., robots for feeding a workpiece to an NC lathe, are operated in accordance with basically fixed motion patterns.

DISCLOSURE OF THE INVENTION

An object of this invention is to provide a method of teaching a robot motion program which facilitates the preparation of a robot motion program, particularly a robot motion program for operating a robot in accordance with regular motion patterns or motion patterns similar thereto.

To achieve the above object, this invention comprises the steps of: (a) storing into a storage device, a previously created standard motion program for a robot operation where a robot is operated in accordance with a regular motion pattern; (b) displaying the standard motion program read from the storage device on a display screen; and (c) editing the standard motion program on the display screen by manually inputting required data through a data input device, thereby creating a required robot motion program. Preferably, the editing step (c) includes a substep for correcting data contained in the standard motion program on the display screen through the data input device.

As described above, according to this invention, the previously created standard motion program is edited on-screen by manually inputting data through the data input device, to thereby create a required robot motion program, so that manually inputting only required data, such as position data or speed data related to teaching points will be sufficient to create a robot motion program. Accordingly, the operator is required only to learn the data input operation, and thus even an unskilled operator, having no knowledge of programming languages, can readily create a robot motion program. For a skilled operator, this teaching method is useful in that the time required for the program preparation can be reduced substantially.

DETAILED DESCRIPTION OF THE INVENTION

Figure 1:
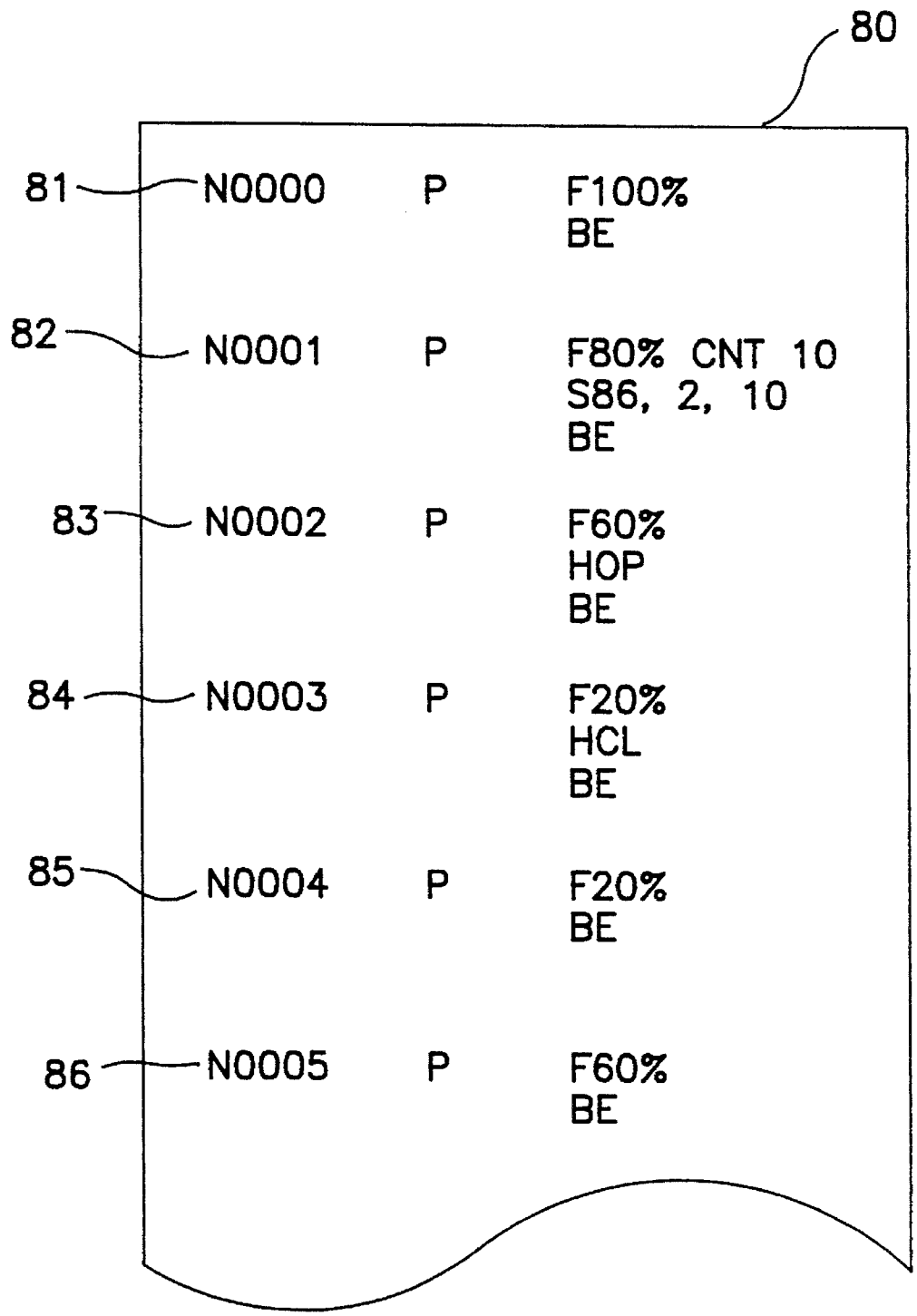
FIG. 1 is a diagram showing, by way of example, part of a robot motion program.
Figure 2:
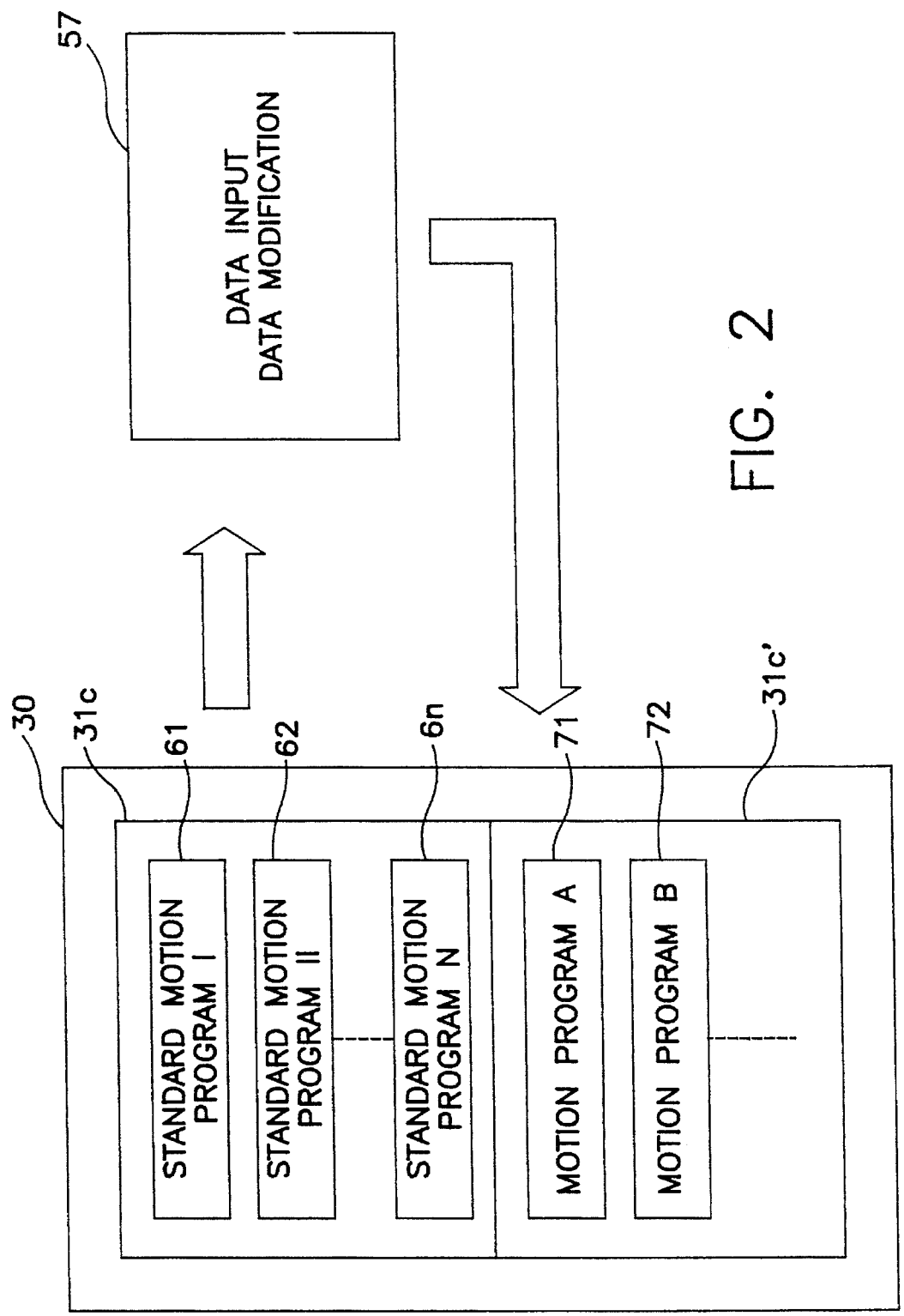
FIG. 2 is a diagram illustrating the concept underlying a method of teaching a robot motion program according to this invention.

Referring to FIG. 2, the concept underlying a method of teaching a robot motion program according to this invention will be described.

First to Nth standard motion programs for operating a robot in accordance with stereotyped motion patterns (only the first, second and Nth standard motion programs are shown at 61, 62 and 6n, respectively) are previously created and stored in a memory, e.g., a random-access memory (RAM) 31c, of a robot control device 30. When preparing a motion program, a required one of the standard motion programs is read from the RAM 31c and displayed on an input display or input menu provided by a display device on a teaching control panel 57. The operator then operates the teaching control panel 57 so as to input, on the screen, required data to the standard motion program, or modify, on the screen, the data contained in the standard motion program, whereby a motion program for an actual robot operation is created. Created motion programs (only first and second motion programs, shown at 71 and 72, respectively) are stored in the RAM 31c.

Figure 3:
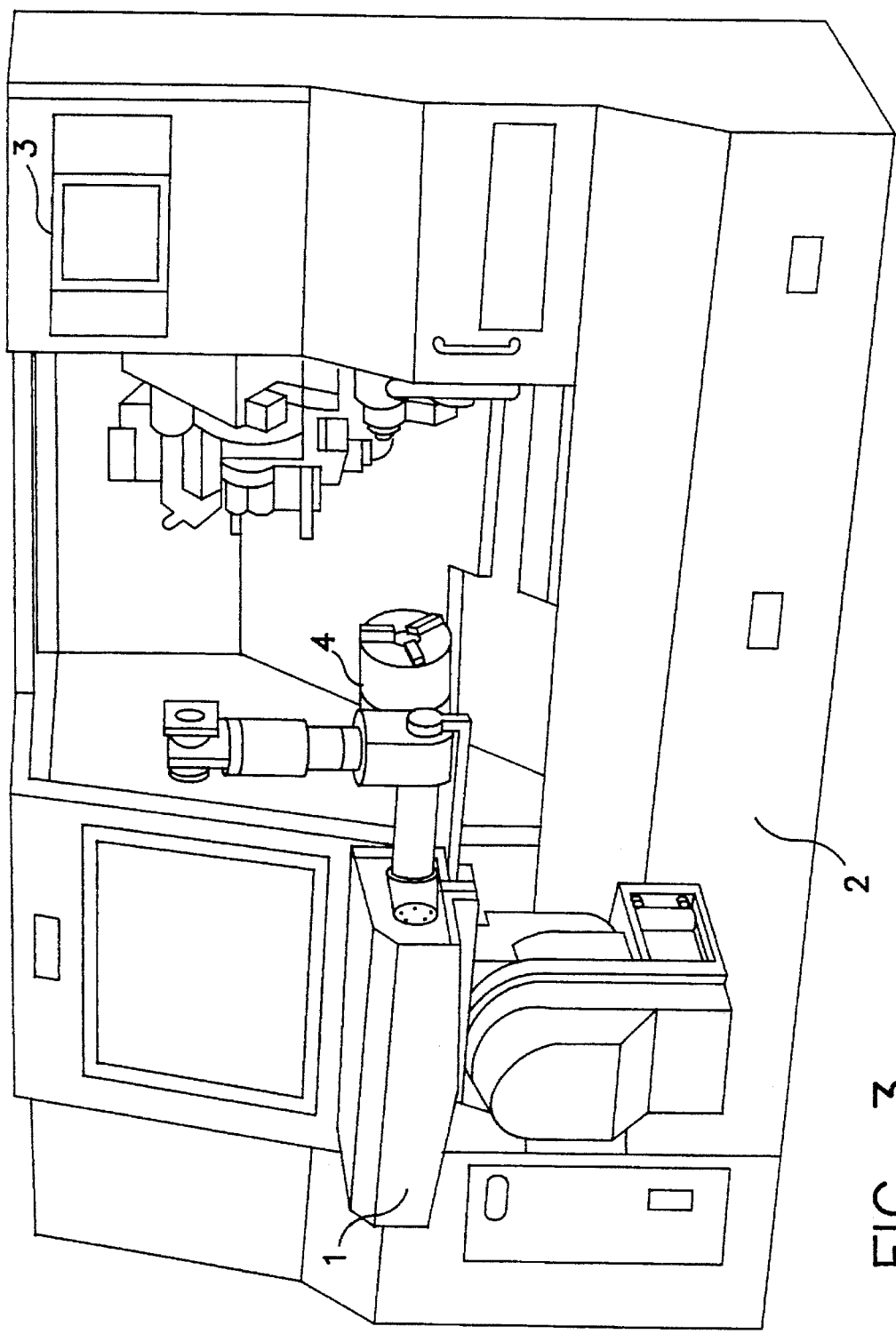
FIG. 3 is a perspective view showing a body of a robot to which a program teaching method according to one embodiment of this invention is applied, together with an NC lathe.
Figure 4:
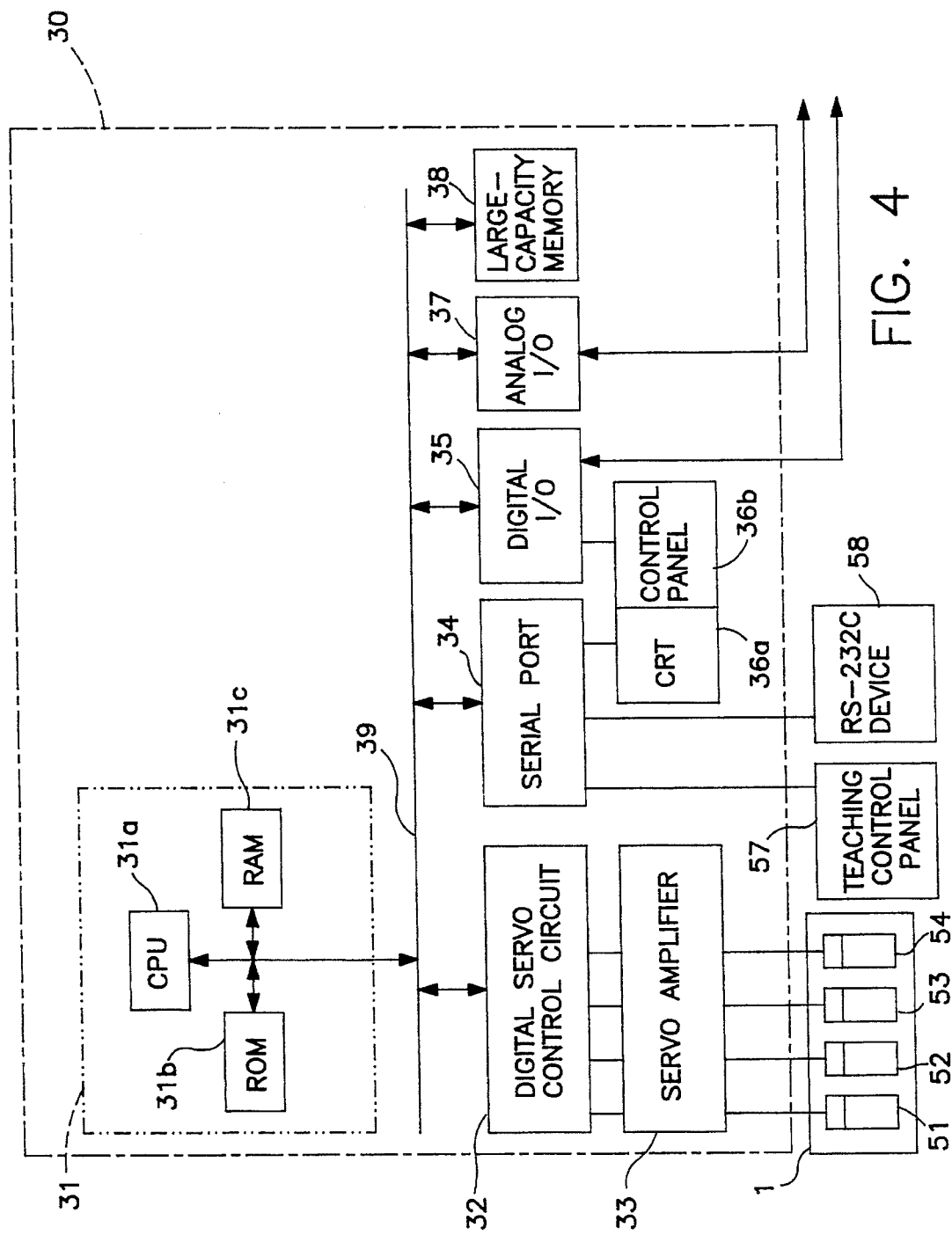
FIG. 4 is a block diagram showing a robot control device for controlling the operation of the robot.

Referring now to FIGS. 3 and 4, an NC lathe, to which a method of teaching a robot motion program according to an embodiment of this invention is applied, will be described.

An NC lathe 2, which includes actuators and sensors (not shown), is arranged to operate under the control of a numerical control device 3. A body 1 of a four-axis robot installed in the NC lathe 2 comprises actuators, including four servomotors 51 to 54 used as drive sources for the individual axes, and sensors, and is operable under the control of the robot control device 30 so as to feed a workpiece from a workpiece feeder (not shown) to a chuck 4 of the NC lathe 2.

The robot control device 30, which cooperates with the robot body 1 to form a robot, includes a processor board 31 on which a processor 31a and a read-only memory (ROM) 31b storing a system program are mounted together with the aforementioned RAM 31c, the ROM 31b and the RAM 31c being connected to the processor 31a via a bus 39. The processor 31a is arranged to globally control the robot control device 30 in accordance with the system program. The RAM 31c includes a nonvolatile memory area 31c ' (FIG. 3) for storing the first to Nth standard motion programs 6l to 6n, the motion programs 71, 72, . . . for actual robot operations, and a program for creating motion programs.

Connected to the processor 31a via the bus 39 are a digital servo control circuit 32, a serial port 34, a digital input/output circuit 35, an analog input/output circuit 37, and a large-capacity memory 38 comprising a hard disk. The digital servo control circuit 32 is arranged to control the operation of the servomotors 51 to 54 through a servo amplifier 33 in accordance with commands supplied from the processor 31a. The serial port 34 is connected to a CRT display device 36a of a manual data input device forming part of the robot control device 30, to the teaching control panel 57 with a display device, and also to an RS-232C device 58, which are external devices of the robot control device 30. The teaching control panel 57 includes a keyboard having numeric keys and character keys, and is arranged to allow numeric and character data and commands to be manually input to the robot control device 30 through key-in operations by the operator. Soft keys are provided at the display device of the teaching control panel 57. Various input menus or input displays are displayed when predetermined soft keys are operated, and the soft keys are individually assigned for different functions corresponding to the kinds of input menus. A control panel 36b of the manual data input device is connected to the digital input/output circuit 35. The digital and analog input/output circuits 35 and 37 are connected to the actuators, sensors, etc. of the body 1 of the robot.

A procedure for creating a motion program will be described with reference to FIGS. 5 through 8.

A motion program is prepared in an interactive mode between the robot control device 30 operated in accordance with the program for creating motion programs and the operator operating the teaching control panel 57. First, when the operator operates a soft key for a program creation command of the teaching control panel 57, the processor 31a of the robot control device 30 detects this, and reads out the motion program creation program from the nonvolatile memory area 31c ' of the RAM 31c. Then, when a manual operation of a menu selection soft key is detected by the processor 31a, a first input menu 10a (FIG. 5) is displayed on the display device of the teaching control panel 57.

Display in the menu 10a are a field 11 for specifying or selecting one of the first to Nth standard motion programs 6l to 6n, a field 12 for specifying the program number representative of a motion program for actual robot operation which is to be created based on the standard motion program specified in the field 11, a field 13 for specifying the foremost register number for the execution of the motion program, a field 14 for specifying the maximum number of workpiece piles, a field 15 for specifying the number of workpiece layers in one pile and a field 16 for displaying a message and data which is input in response to the message.

Figure 5:
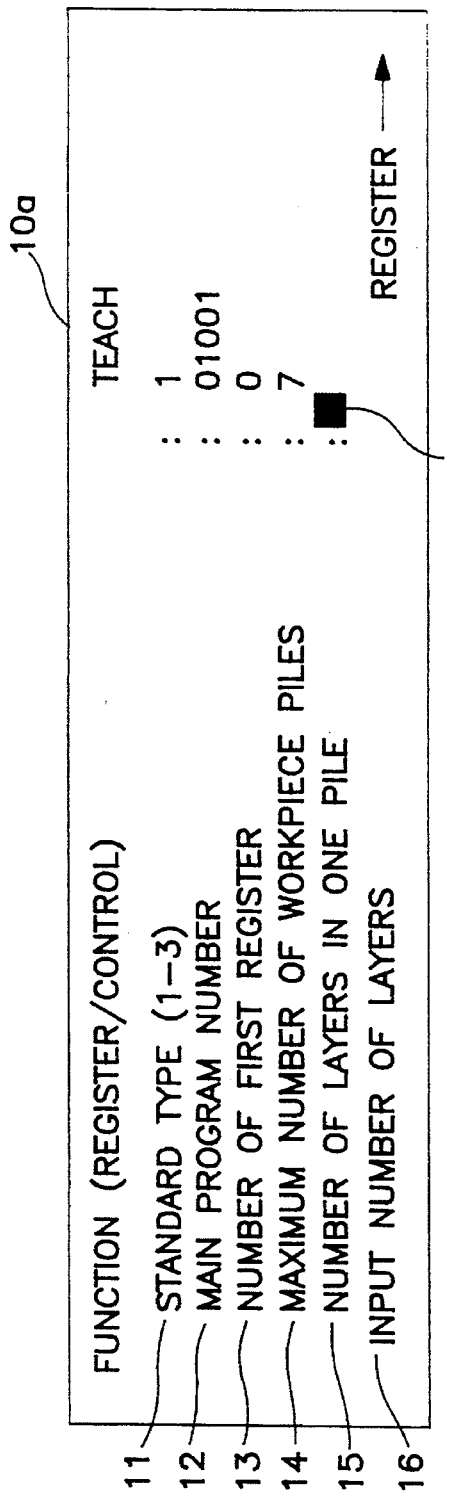
FIG. 5 is a diagram showing a first input menu for selecting a required standard motion program etc.
Figure 6:
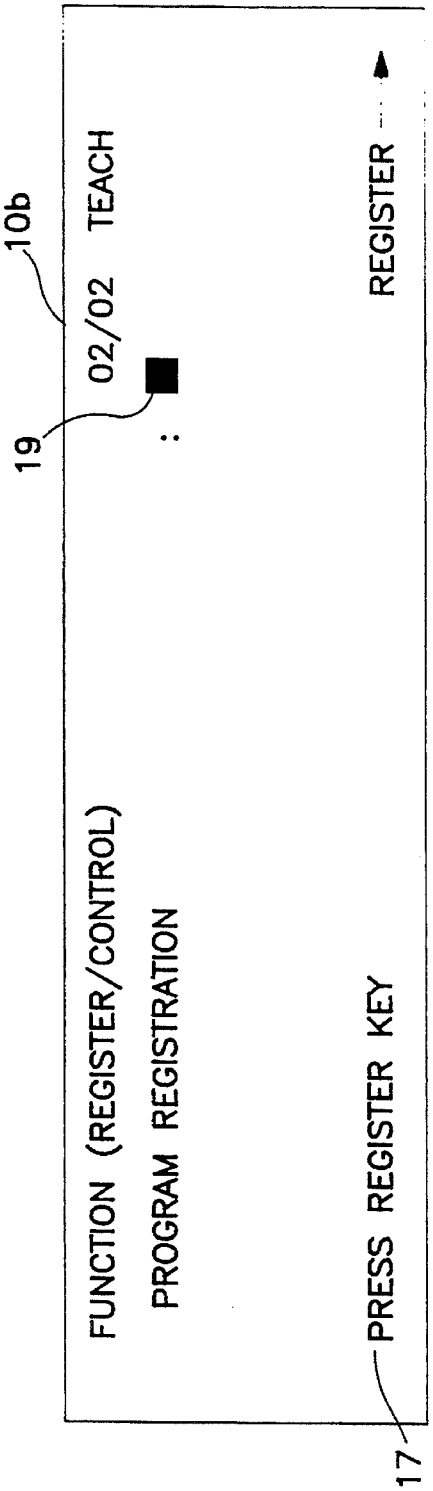
FIG. 6 is a diagram showing a second input menu displaying a message requesting a registration of data input according to the first input menu.

FIG. 5 shows a state in which the first standard motion program 61, the motion program number "01001", the first register number "0" and the maximum number "7" of workpiece piles have been specified by the first input menu 10a and "5", as the number of workpiece layers in one pile, has just been input in the field 16 of the menu 10a in response to the message "INPUT NUMBER OF LAYERS." In this case, a prompt 19 appears at the data input position of the layer selection field 15. When, thereafter, a soft key which is assigned for a registration function is operated to complete the data input through the first input menu 10a, the first input menu 10a of FIG. 5 switches to a second input menu 10b shown in FIG. 6. In the menu 10b, a message 17 requesting a depression of a register key will be displayed. When the operator operates a registration soft key in answer to the message 17, the input data shown in FIG. 5 is stored in the RAM 31c of the robot control device 30, then the second input menu 10b of FIG. 6 switches to a third input menu 10c shown in FIG. 7, and a message 18 notifying the completion of the registration of the data will be displayed.

Figures 7, 8:
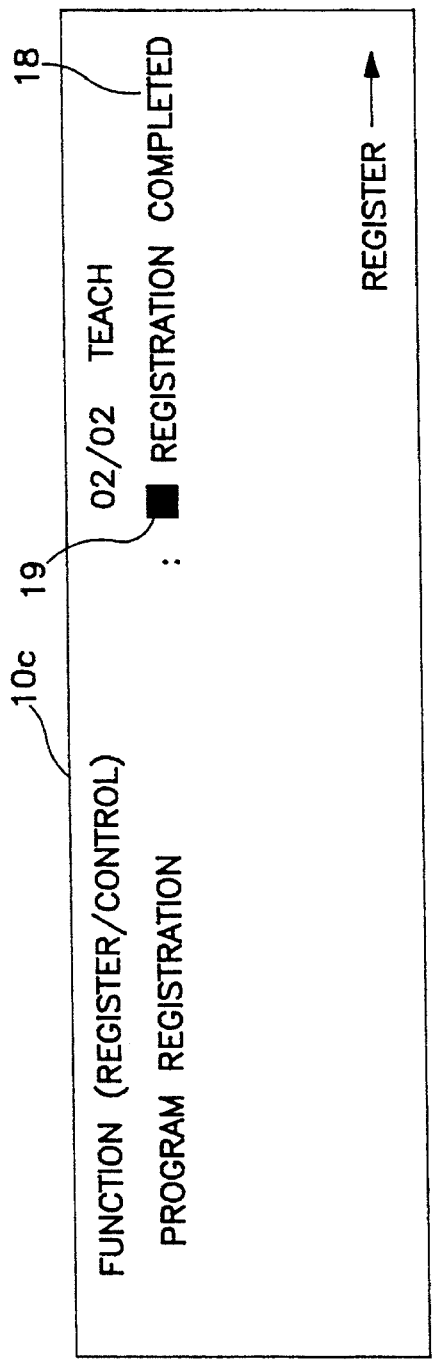
FIG. 7 is a diagram showing a third input menu displaying a message indicating a completion of data registration.
FIG. 8 is a diagram showing a fourth input menu permitting an input of position and speed data.

Thereafter, upon operation of the menu selection soft key by the operator, the third input menu 10c of FIG. 7 switches to a fourth input menu 20, shown in FIG. 8, for position and speed data input. Displayed in the menu 20 are fields 21 to 24 into which moving speeds F (expressed in percentage based on a steady-state speed) of the robot hand for the robot hand movement toward a required number of teaching points, e.g., four teaching points P001 to P004, and coordinate values B, Z, A and α along B, Z, A and α axes of the four-axis robot at the respective teaching points P are to be inputted, and a field 25 for displaying a message concerning the teaching point at which a cursor 29 is then positioned.

In the fourth input menu 20 shown in FIG. 8, moving speeds F and coordinate values B, Z, A and α with respect to the teaching points P001, P002 and P004, which are suitable for the motion program (in the illustrated example, a palletizing program) to be created based on the first standard motion program 61 (FIG. 2), are first displayed in the three fields 21, 22 and 24. On the other hand, the moving speed F and the coordinate values B, Z, A and α in the field 23 relating to the teaching point P003 are undefined, and hence a mark "***", indicating that these values are required to be set by the operator, will be displayed for each item. At first, the cursor 29 is positioned at the first field 21 relating to the teaching point P001, and a message "TEACH PALLETIZING START POSITION" relating to this teaching point P001 will be displayed at the message field 25.

Accordingly, the operator operates a cursor key on the teaching control panel 57 to move the cursor 29 to the third field 23. As a result, a message (not shown) requesting an input of the moving speed and coordinate values with respect to the teaching point P003 is displayed in the message field 25. The operator operates numeric keys etc. on the teaching control panel 57 to manually input the moving speed F and coordinate values B, Z, A and α related to the teaching point P003. If necessary, the operator modifies the moving speed and/or coordinate values of the teaching points P001, P002 and/or P004, which have previously been described in the standard motion program as shown in FIG. 8, by operating the control panel 57. In this case, as the cursor 29 is moved to one of the fields 21 to 24, a message explaining the corresponding data to be inputted, which will be determined by the cursor position, is displayed in the field 25.

As mentioned above, the operator adds necessary data to or modifies the previously described data in the standard motion program, referring to the various messages displayed at the field 25. When the data input is complete, the operator operates the registration soft key, whereby the input data is stored in the RAM 31c. Based on the standard motion program and the input data, the processor 31a creates a motion program for robot operation, e.g., a palletizing program, and causes the created program to be stored in the RAM 31c to end the motion program creation process.

This invention is not limited to the above-described embodiment, and various modifications thereof may be made.

For example, although the embodiment is described with reference to the creation of a motion program for a four-axis robot used in combination with an NC lathe, this invention can be applied to the creation of motion programs for various robots which perform stereotyped motions. The contents of the display shown in FIGS. 5 to 8, which are related to a palletizing program, may be modified in various ways.

Instead of inputting position data through the keyboard of the teaching control panel 57, the robot operating part such as the robot hand may first be moved to the teaching point by means of a jog feed, and position data may be inputted by operating a position data input key (not shown) of the teaching control panel 57, with the robot operating part positioned at the teaching point. In this case, sensor outputs representing the coordinate values along the respective axes of the robot at the teaching point are automatically inputted in response to the key-in operation.

Further, an additional input menu for an input of data such as the number of workpieces and the size of a pallet for receiving workpieces may be provided to permit such data entry.

Furthermore, the standard motion programs and the motion program creation program may be stored in the ROM 31b or the hard disk 38, instead of in the RAM 31c. In the case wherein a large number of standard motion programs must be prepared or the amount of information related to the messages and other data to be contained in the standard motion programs is large, the program are preferably stored in the hard disk 38. The hard disk 38 may be provided as an external device of the robot control device 30.

Further, a menu for starting the created motion program may be provided to enable an operation check and modification of the motion program.

We claim:

1. A method of creating a robot motion program using one of a plurality of standard motion programs previously created, said method comprising the steps of:

(a) storing the previously created standard motion programs for robot operation into a storage device, with different identification symbols attached to each of the standard motion programs;

(b) reading out a specified standard motion program from among the standard motion programs stored in the storage device by a selective key input operation for one of the identification symbols on a display screen;

(c) assigning, on the display screen, data inputting columns for plural input items relating to only position data and speed data on the specified standard motion program selected in said step (b), then displaying, in first ones of the data inputting columns, previously created data suitable for the first ones of the data inputting columns, and displaying nothing in second ones of the data inputting columns waiting for new data from an operator;

(d) modifying, if necessary, ones of the suitable data displayed in the first ones of the data inputting columns by overwriting thereon updated data by key operation, and inputting the new data in the second ones of the data inputting columns waiting for the new data; and (e) applying the position data and speed data, input in the data inputting columns, to the specified standard motion program selected in said step (b), and storing the standard motion program along with the applied position data and speed data as the robot motion program.

2. The method of creating a robot motion program according to claim 1, wherein said step (c) comprises a step of displaying a message relating to the suitable data and the new data, together with the specified standard motion program.

3. The method of creating a robot motion program according to claim 1, wherein said step (d) comprises the steps of:

moving a movable part of the robot to a teaching point by using a jog feed; and detecting the teaching point of the movable part of the robot using a robot sensor and, in response, inputting the teaching point as the position data.

4. The method of creating a robot motion program according to claim 1, further comprising the steps of:

moving a workpiece to an NC lathe using the robot, based on the robot motion program; and performing an operation on the workpiece using the NC lathe.

5. The method of creating a robot motion program according to claim 1, further comprising moving a pallet using the robot, based on the robot motion program.

6. The method of creating a robot motion program according to claim 5, wherein said step (d) comprises a step of manually adding, on the display screen, data representing a number of workpieces and data representing a size of a pallet for receiving the workpieces.

7. The method of creating a robot motion program according to claim 1, further comprising the step of arranging the storage device, which comprises a large-capacity memory, internally of a robot control device.

8. The method of creating a robot motion program according to claim 1, further comprising the step of displaying, on the display screen, a menu for starting the created robot motion program, to permit an execution of the created robot motion program for an operation check thereof.

9. The method of creating a robot motion program according to claim 1, further comprising the step of arranging the storage device, which comprises a large-capacity memory, externally of a robot control device.

10. A method of creating a robot motion program which controls a robot, said teaching method comprising:

selecting one of a plurality of standard motion programs for robot operation from a storage unit and inputting information, pertaining to material on which the robot will work on, using a first menu displayed on a display, each standard motion program having a given logic;

registering said selection of one of said plurality of standard motion programs and said information pertaining to the material, and storing said selection and said information in a memory in the storage unit using a second menu;

displaying a third menu indicating that said registration is completed; and editing only teaching points, moving speeds associated with said teaching points and coordinate values associated with said teaching points, of said selected standard motion program, without modifying the given logic of said selected standard motion program, using a fourth menu.

* * * * *

UNITED STATES PATENT AND TRADEMARK OFFICE
CERTIFICATE OF CORRECTION

PATENT NO. : 5,485,552
DATED : January 16, 1996
INVENTOR(S) : Tohru MIZUNO, et al.

It is certified that error appears in the above-indentified patent and that said Letters Patent is hereby corrected as shown below:

Column 3, line 29, please delete "(FIG. 3)" and substitute therefor --(FIG. 2)--.

Signed and Sealed this

Eleventh Day of June, 1996

Attest:

BRUCE LEHMAN

Attesting Officer    Commissioner of Patents and Trademarks